US009396174B1

United States Patent
Alves et al.

(10) Patent No.: US 9,396,174 B1
(45) Date of Patent: Jul. 19, 2016

(54) INSERTING AND USING METADATA WITHIN A PORTABLE DOCUMENT FORMAT DOCUMENT

(71) Applicants: KABUSHIKI KAISHA TOSHIBA, Tokyo (JP); TOSHIBA TEC KABUSHIKI KAISHA, Tokyo (JP)

(72) Inventors: Natasha Alves, Blacktown South (AU); David L. Geering, Birchville (NZ); Martin Corr, Hunters Hill (AU); Ben Lear, Bangor (AU); Mark A. Greene, Emu Plains (AU)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/656,133

(22) Filed: Mar. 12, 2015

(51) Int. Cl.
  *G06K 15/02* (2006.01)
  *G06F 17/22* (2006.01)
  *G06F 17/30* (2006.01)
  *H04N 1/32* (2006.01)

(52) U.S. Cl.
  CPC ...... *G06F 17/2247* (2013.01); *G06F 17/30011* (2013.01); *G06K 15/1813* (2013.01); *H04N 1/32149* (2013.01); *H04N 2201/0094* (2013.01)

(58) Field of Classification Search
  None
  See application file for complete search history.

(56) References Cited

U.S. PATENT DOCUMENTS

| 7,538,910 | B2 * | 5/2009 | Czudak | G06F 3/121 358/1.15 |
| 7,864,353 | B2 | 1/2011 | Choi et al. | |
| 8,270,717 | B2 | 9/2012 | Isshiki | |
| 8,767,230 | B2 * | 7/2014 | Otomaru | G06F 3/1296 358/1.1 |
| 8,902,456 | B2 * | 12/2014 | Robinson | G06F 3/1206 358/1.15 |
| 2009/0195807 | A1 * | 8/2009 | Soneoka | H04N 1/00222 358/1.13 |
| 2013/0016389 | A1 | 1/2013 | Robinson | |

* cited by examiner

*Primary Examiner* — Paul F Payer
(74) *Attorney, Agent, or Firm* — SoCal IP Law Group LLP; Steven C. Sereboff; Jonathan P. Pearce

(57) ABSTRACT

Inserting and using metadata within a portable document format document comprises of a portable document format writer for receiving a request to generate a portable document format document including custom metadata, generating the portable document format document in a form compliant with portable document format, the data including at least a portable document format header, at least one portable document format stream, and a portable document format catalog, inserting at least one extensible markup language identifier to the portable document format document immediately following the extensible markup language identifier, inserting at least one set of extensible markup language data to the portable document format document, as directed by the request, within the data immediately following the at least one extensible markup language identifier and before the at least one portable document format stream, and preceding the portable document format catalog, and storing the portable document format document.

18 Claims, 7 Drawing Sheets

© 2015 Toshiba Tec Kabushiki Kaisha
& Kabushiki Kaisha Toshiba

INSERTING AND USING METADATA WITHIN A PORTABLE DOCUMENT FORMAT DOCUMENT

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by anyone of the patent disclosure as it appears in the Patent and Trademark Office patent files or records, but otherwise reserves all copyright and trade dress rights whatsoever.

BACKGROUND

1. Field

This disclosure relates to a system and method for inserting and using metadata within a portable document format document.

2. Description of the Related Art

A multifunction peripheral (MFP) is a type of document processing device which is an integrated device, providing at least two document processing functions, such as print, copy, scan and fax. In a document processing function, an input document (electronic or physical) is used to automatically produce a new output document (electronic or physical).

Documents may be physically or logically divided into pages. A physical document is paper or other physical media bearing information which is readable unaided by the typical human eye. An electronic document is any electronic media content (other than a computer program or a system file) that is intended to be used in either an electronic form or as printed output. Electronic documents may consist of a single data file, or an associated collection of data files which together becomes a unitary whole. Electronic documents will be referred to further herein as documents, unless the context requires some discussion of physical documents which will be referred to by that name specifically.

In printing, the MFP automatically produces a physical document from an electronic document. In copying, the MFP automatically produces a physical document from a physical document. In scanning, the MFP automatically produces an electronic document from a physical document. In faxing, the MFP automatically transmits via fax an electronic document from an input physical document which the MFP has also scanned or from an input electronic document which the MFP has converted to a fax format.

MFPs are often incorporated into corporate or other organization's networks which also include various other workstations, servers and peripherals. An MFP may provide remote document processing services to external or networked devices.

Portable document format (PDF) writers typically enable the conversion of other document file formats (e.g. Microsoft® Word, jpeg images, and other formats) into portable document file formats. The benefit of the portable document format is that it is entirely (or nearly entirely) self-contained including all text, all formatting, all images, tables and any other formatting necessary for viewing and, if desired, printing the document. As a result, PDF writers are used to convert files for viewing and output on virtually any computer, device, printer or MFP.

The PDF standard was defined originally by Adobe Systems, Inc. and, more recently, by the International Standards Organization (ISO). PDF/A is a particular version of the PDF standard that is intended for use in document archival systems by enforcing a more rigid structure for the documents such that no fonts external to the document itself (e.g. system fonts) are referenced in PDF documents conforming to this standard. Document archival systems may be required to be accessed tens (or hundreds) of years after the documents are stored therein. As a result, it is advisable to avoid as many potential future compatibility issues outside of elements native to the document format itself that may be avoided.

Unfortunately, the rigidity of the file format itself has necessitated the use of external, associated files to control the automatic archiving of such documents. In order to quickly scan, digitize, and archive many thousands of documents, data derived therefrom may be used. For example, in a batch of extensive medical records, a patient name (or patient ID) may be used to associate a series of documents all pertaining to a particular patient. The name or ID may be derived from data in a physical document, or a preexisting PDF document, but may be stored in any number of ways within a PDF/A format compliant PDF document depending on the way in which the resulting PDF document is generated. Thus, it can be difficult for a computer system to refer to name or ID in order to accurately dispose of the PDF document during an archival (or retrieval) process.

In order to remedy this problem, the prior art has relied upon the generation of external documents, associated with each PDF document, to store characteristics, data, keywords, search terms, instructions and other, similar data related to the PDF document being archived. While this process is useful in archiving, it undermines the self-contained nature of PDF/A compliance and ensuring that the external documents remain associated with the appropriate (or any) PDF document may be difficult or may be inadvertently lost or destroyed over time as computer systems evolve. This is not desirable for long-term document archival systems.

Figure 1:
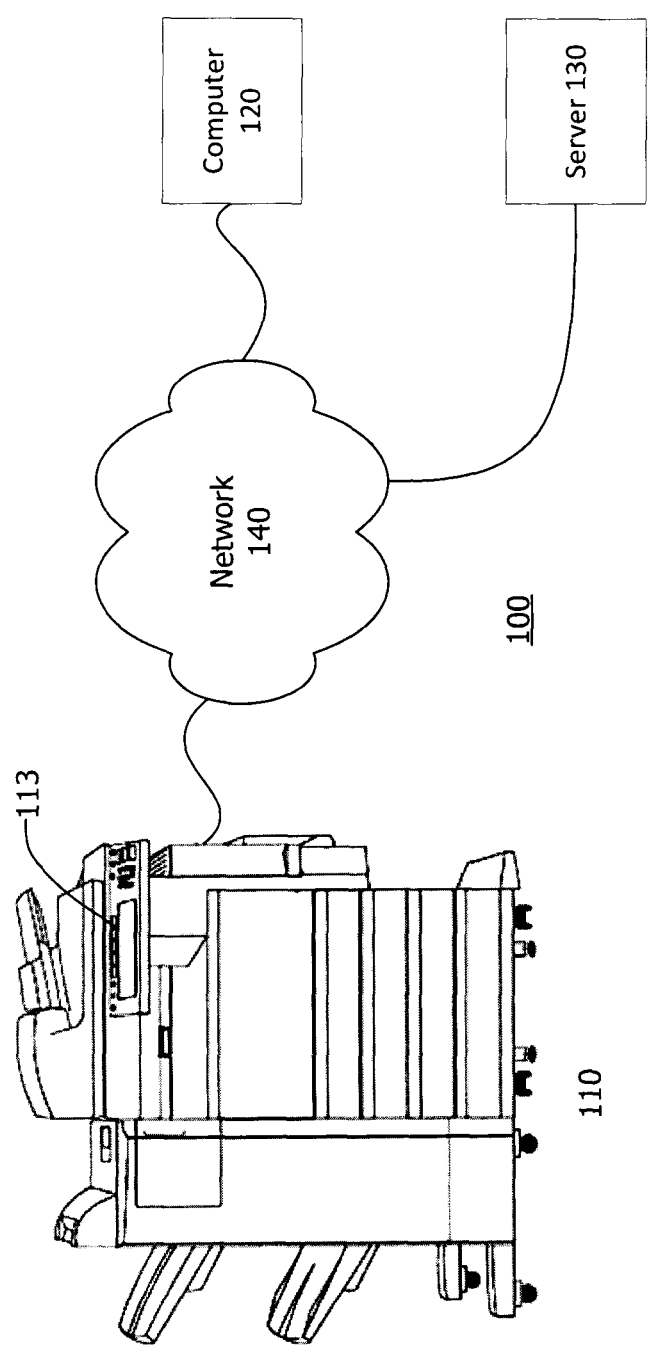
FIG. 1 is a diagram of a system.

Throughout this description, elements appearing in figures are assigned three-digit reference designators, where the most significant digit is the figure number where the element is introduced, and the two least significant digits are specific to the element. An element that is not described in conjunction with a figure may be presumed to have the same characteristics and function as a previously-described element having the same reference designator.

DETAILED DESCRIPTION

Incorporating desired or useful data that may have previously been stored external to a particular PDF document during or prior to archival is desirable. However, this must be accomplished in such a way as to not interfere with PDF/A compatibility. Injecting unnecessary data into a PDF document can cause a PDF document to not function properly or can inadvertently alter the visual representation of data generated by a PDF viewer.

Incorporating external data is supported by PDF/A by adding additional data tags to the PDF document so-called "catalog" which is a table-of-contents-like data set that is appended to each PDF document after all data used to generate the PDF document is written to the PDF document. On a basic level, a PDF document is made up of a "header," a series of one or more "data streams" made up of text, images, and formatting data, followed by a "catalog" that indicates where in the PDF document each data stream may be found. The catalog may also include references to other data. In the past, this catalog has been used to refer to non-essential data for graphical representation, such as information about when the document was created, what PDF software created the PDF document and, occasionally, to refer to non-essential data embedded in the PDF document.

The primary problem with this is that a computer system must work through the entirety (i.e. load into memory, process, then act upon) of a PDF document from the beginning of the document through to the catalog, review the catalog, then search the document again for the embedded data stored within the PDF document once the catalog has been used to identify the location of the embedded data within the PDF document. Typically, this is accomplished by the catalog, located at the end of the PDF document, identifying a special "tag" or token that is used to flag the embedded data that appears earlier in the PDF document. As a result, especially in the archival context, the requirement to load, view and then search again through the document itself before the embedded data may be found is unnecessarily taxing and drastically slows the archival process. In contrast, loading a tiny, extensible markup language (XML) document known to be associated with the PDF document is incredibly quick and imposes low overhead on computing systems.

Thus, incorporating a simple tag, known to be present within a PDF document without the need to open, process the catalog, reference the PDF document again to search for a tag is preferable. The most obvious benefits are to avoid the necessity of associated not-fully-encapsulated documents and to enable a low-processing time, fast method for directing archival and print activities with reference to embedded data directly in the PDF document. Secondarily, decreasing the processing and time overhead enables archival activities to be reasonably undertaken by computers (processors, specifically) with less computing power than a full personal computer or server (for example, by lower-power processors in MFPs being used in conjunction with document management systems to perform archival operations, for example of newly-scanned documents).

Description of Apparatus

Referring now to FIG. 1, a system 100 may include a document processing device 110, a computer 120, and a server 130, connected by a network 140. A system 100 may include more than one document processing device 110 and more than one computing device 120.

The document processing device 110 may be configured to provide one or more document processing operations such as printing, copying, scanning and faxing. The document processing device 110 may be, as shown, a MFP capable of performing two or more document processing operations. A user interface 113 may be or include physical buttons, a capacitive or physically-reactive display including interactive visual elements generated by software.

Figure 3:
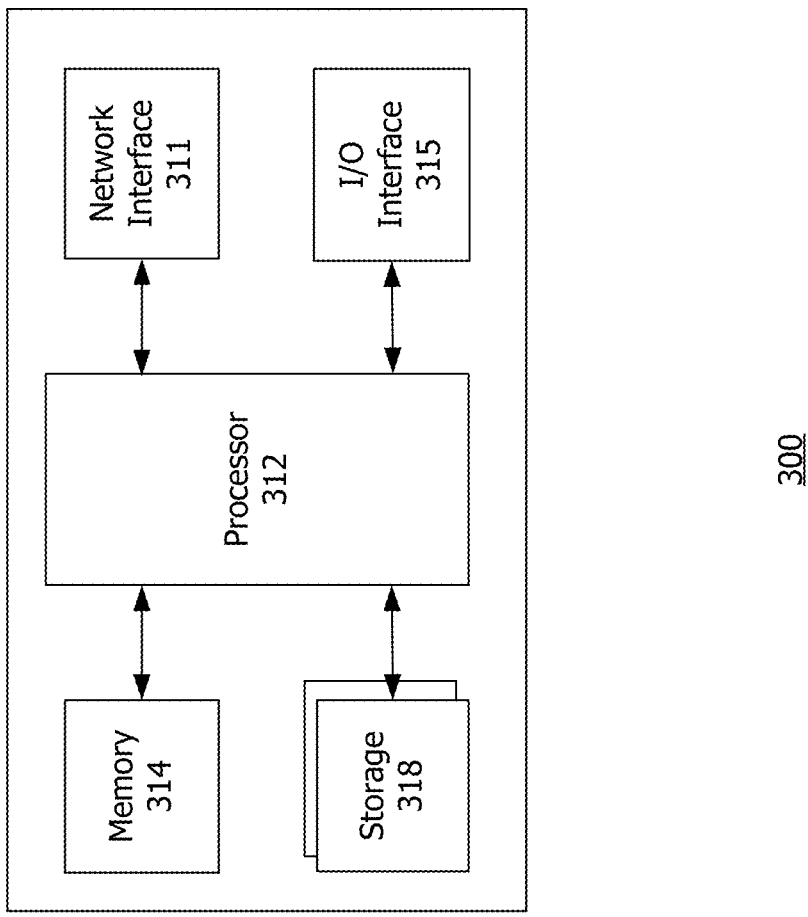
FIG. 3 is a block diagram of a computing device.

The computer 120 is computing device (as shown in FIG. 3) that utilizes software to access and/or create documents for transmission to the document processing device 110 or to the server 130, via the network 140. The computer 120 includes software operating on a computing device. The computer 120 may include print driver software, portable document format writing software, in addition to application software for generating, viewing, editing or accessing files of various types. The computer may be a traditional desktop or laptop computer, but may also take the form of a mobile device, a smart phone, a tablet or other, similar computing devices.

The server 130 is a computing device (as shown in FIG. 3) that utilizes software to access and/or store documents in, for example, a document management system or digital document archive. The server 130 includes software operating on a computer device and may include application software comprising a document management system including access to a document management system database for storing documents. The server is, typically, a server-class computer accessible via the network 140, but may take any number of forms.

The network 140 may be or include a local area network, a wide area network, a personal area network, a mobile or telephone network, the Internet, an intranet, or any combination of these. The network 140 may have physical layers and transport layers according to IEEE 802.11, Ethernet or other wireless or wire-based communication standards and protocols such as WiMAX®, Bluetooth®, mobile telephone and data protocols, the public switched telephone network, a proprietary communications network, infrared, and optical.

Figure 2:
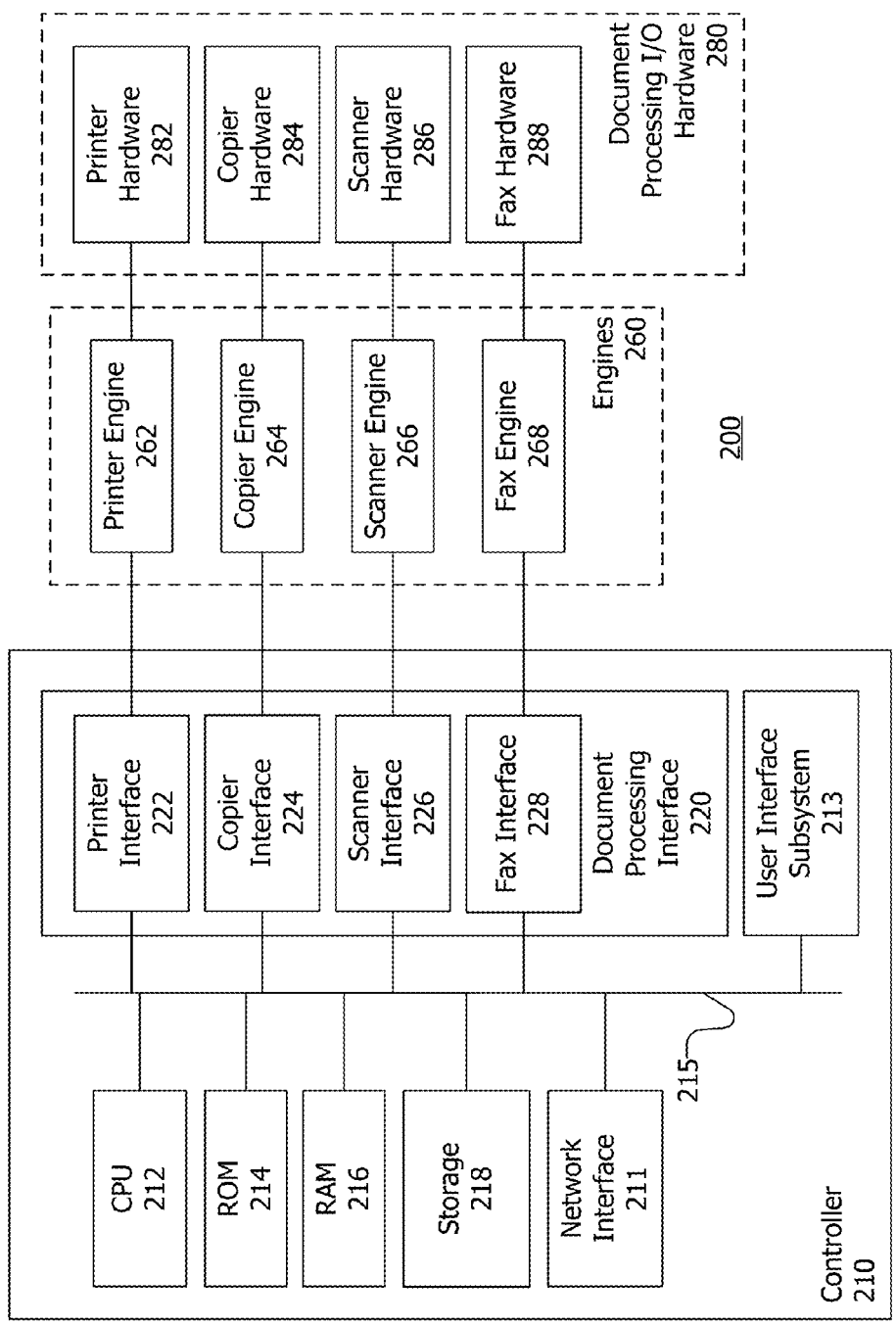
FIG. 2 is a block diagram of a MFP.

FIG. 2 is a block diagram of an MFP 200 which may be the document processing device 110. The MFP 200 includes a controller 210, engines 260 and document processing I/O hardware 280. The controller 210 includes a CPU 212, a ROM 214, a RAM 216, a storage 218, a network interface 211, a bus 215, a user interface subsystem 213 and a document processing interface 220.

As shown in FIG. 2 there are corresponding components within the document processing interface 220, the engines 260 and the document processing I/O hardware 280, and the components are respectively communicative with one another. The document processing interface 220 has a printer interface 222, a copier interface 224, a scanner interface 226 and a fax interface 228. The engines 260 include a printer engine 262, a copier engine 264, a scanner engine 266 and a fax engine 268. The document processing I/O hardware 280 includes printer hardware 282, copier hardware 284, scanner hardware 286 and fax hardware 288.

The MFP 200 is configured for printing, copying, scanning and faxing. However, an MFP may be configured to provide other document processing functions, and, as per the definition, as few as two document processing functions.

The CPU 212 may be a central processor unit or multiple processors working in concert with one another. The CPU 212 carries out the operations necessary to implement the functions provided by the MFP 200. The processing of the CPU 212 may be performed by a remote processor or distributed processor or processors available to the MFP 200. For example, some or all of the functions provided by the MFP 200 may be performed by a server or thin client associated with the MFP 200, and these devices may utilize local resources (e.g., RAM), remote resources (e.g., bulk storage), and resources shared with the MFP 200.

The ROM 214 provides non-volatile storage and may be used for static or fixed data or instructions, such as BIOS functions, system functions, system configuration data, and other routines or data used for operation of the MFP 200.

The RAM 216 may be DRAM, SRAM or other addressable memory, and may be used as a storage area for data instructions associated with applications and data handling by the CPU 212.

The storage 218 provides volatile, bulk or long term storage of data associated with the MFP 200, and may be or include disk, optical, tape or solid state. The three storage components, ROM 214, RAM 216 and storage 218 may be combined or distributed in other ways, and may be implemented through SAN, NAS, cloud or other storage systems.

The network interface 211 interfaces the MFP 200 to a network, such as the network 122 (FIG. 1), allowing the MFP 200 to communicate with other devices.

The bus 215 enables data communication between devices and systems within the MFP 200. The bus 215 may conform to the PCI Express or other bus standard.

While in operation, the MFP 200 may operate substantially autonomously.

However, the MFP 200 may be controlled from and provide output to the user interface subsystem 213.

The document processing interface 220 may be capable of handling multiple types of document processing operations and therefore may incorporate a plurality of interfaces 222, 224, 226 and 228. The printer interface 222, copier interface 224, scanner interface 226, and fax interface 228 are examples of document processing interfaces. The interfaces 222, 224, 226 and 228 may be software or firmware.

Each of the printer engine 262, copier engine 264, scanner engine 266 and fax engine 268 interact with associated printer hardware 282, copier hardware 284, scanner hardware 286 and facsimile hardware 288, respectively, in order to complete the respective document processing functions.

Turning now to FIG. 3, a computing device 300 may be representative of the server computers, client devices, mobile devices and other computing devices discussed herein. The controller 210 of FIG. 2 may also incorporate, in whole or in part, a general purpose computer like the computing device 300. The computing device 300 may include software and/or hardware for providing functionality and features described herein. The computing device 300 may therefore include one or more of: logic arrays, memories, analog circuits, digital circuits, software, firmware and processors. The hardware and firmware components of the computing device 300 may include various specialized units, circuits, software and interfaces for providing the functionality and features described herein.

The computing device 300 may have a processor 312 coupled to a memory 314, storage 318, a network interface 311 and an I/O interface 315. The processor may be or include one or more microprocessors and application specific integrated circuits (ASICs).

The memory 314 may be or include RAM, ROM, DRAM, SRAM and MRAM, and may include firmware, such as static data or fixed instructions, BIOS, system functions, configuration data, and other routines used during the operation of the computing device 300 and processor 312. The memory 314 also provides a storage area for data and instructions associated with applications and data handled by the processor 312.

The storage 318 may provide non-volatile, bulk or long term storage of data or instructions in the computing device 300. The storage 318 may take the form of a disk, tape, CD, DVD, or other reasonably high capacity addressable or serial storage medium. Multiple storage devices may be provided or available to the computing device 300. Some of these storage devices may be external to the computing device 300, such as network storage or cloud-based storage.

The network interface 311 may be configured to interface to a network such as network 122 (FIG. 1).

The I/O interface 315 may be configured to interface the processor 312 to peripherals (not shown) such as displays, keyboards and USB devices.

Figure 4:
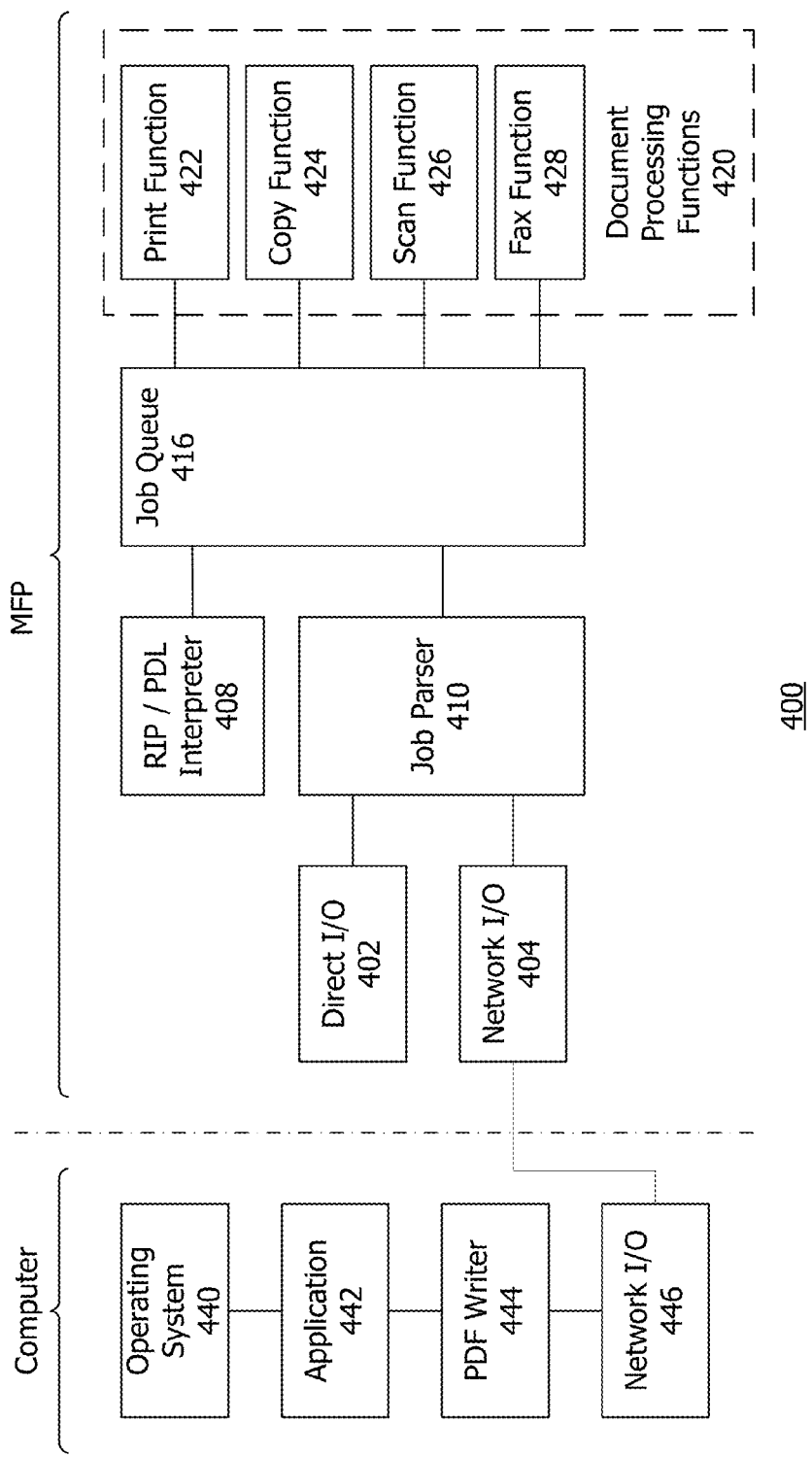
FIG. 4 is a block diagram of a software system for an MFP and a computer.

FIG. 4 is a block diagram of a software system 400 including an MFP, which may be the document processing device 110 of FIG. 1, and a computer, which may be the computer 120 of FIG. 1.

The portion of the software system 400 within the MFP may operate, for example, on the controller 210 of the MFP 200. The portion of the software system 400 within the MFP may include client direct I/O 402, client network I/O 404, a RIP/PDL interpreter 408, a job parser 410, a job queue 416, a series of document processing functions 420 including a print function 422, a copy function 424, a scan function 426 and a fax function 428.

The client direct I/O 402 and the client network I/O 404 may provide input and output to the MFP controller. The client direct I/O 402 is for the user interface on the MFP, and the client network I/O 404 is for user interfaces over the network. This input and output may include documents for printing or faxing or parameters for MFP functions. In addition, the input and output may include control of other operations of the MFP. The network-based access via the client network I/O 404 may be accomplished using HTTP (hypertext transfer protocol), FTP (file transfer protocol), UDP (user datagram protocol), TCP (transmission control protocol), electronic mail, TELNET or other network communication protocols.

The RIP/PDL (Raster Image Processor/Page Description Language) interpreter 408 may transform PDL-encoded documents received by the MFP into raster images or other forms suitable for use in MFP functions and output by the MFP. The RIP/PDL interpreter 408 processes the document and adds the resulting output to the job queue 416 to be output by the MFP.

The job parser 410 interprets a received document and relays it to the job queue 416 for handling by the MFP. The job parser 410 may perform functions of interpreting data received so as to distinguish requests for operations from documents and operational parameters or other elements of a document processing request. The job parser 410 may also include capability to parse XML data embedded within a PDF document in order to perform actions in accordance with embedded XML data or to obtain data from embedded XML data in a PDF document.

The job queue 416 stores a series of jobs for completion using the document processing functions 420. Various image forms, such as bitmap, page description language or vector format may be relayed to the job queue 416 from the scan function 426 for handling. The job queue 416 is a temporary repository for all document processing operations requested by a user, whether those operations are received via the job parser 410, the client direct I/O 402 or the client network I/O 404.

The job queue 416 and associated software is responsible for determining the order in which print, copy, scan and facsimile functions are carried out. These may be executed in the order in which they are received, or may be influenced by the user, instructions received along with the various jobs or in other ways so as to be executed in different orders or in sequential or simultaneous steps. Information such as job control, status data, or electronic document data may be exchanged between the job queue 416 and users or external reporting systems.

The job queue 416 may also communicate with the job parser 410 in order to receive PDL files from the client direct I/O 402. The client direct I/O 402 may include printing, fax transmission or other input of a document for handling by the software system 400.

The print function 422 enables the MFP to print documents and implements each of the various functions related to that process. These include stapling, collating, hole punching, and similar functions. The copy function 424 enables the MFP to perform copy operations and all related functions such as multiple copies, collating, 2 to 1 page copying or 1 to 2 page copying and similar functions. Similarly, the scan function 426 enables the MFP to scan and to perform all related functions such as shrinking scanned documents, storing the documents on a network or emailing those documents to an email address. The fax function 428 enables the MFP to perform facsimile operations and all related functions such as multiple number fax or auto-redial or network-enabled facsimile.

Some or all of the document processing functions 420 may be implemented on a client computer, such as a personal computer or thin client. The user interface for some or all document processing functions may be provided locally by the MFP's user interface subsystem though the document processing function is executed by a computing device separate from but associated with the MFP.

The computer may include an operating system 440, an application 442, a PDF driver 444 and network I/O 446. The operating system 440 runs as a base level of software to enable other applications and drivers to operate thereupon. The application 442 may be one or more applications such as a word processing application or image editor.

The application 442 may have access to one or more PDF writers, such as PDF writer 444, for converting files (such as documents and image files) into portable document format documents suitable for storage or subsequent output by an MFP. The PDF writer 444 may be a standalone application operating upon the computer or may be a part of another application (such as the ability of Adobe® Professional software to directly write PDF document files. Still further alternatively (and most commonly), the PDF writer 444 may be a sub-function of a printer driver such that a user may select a "print" function from any application that calls upon the operating system "print" functionality to use a page description language or PostScript® document to generate a compatible PDF document. These types of PDF writer's are common.

Still further specifically, the PDF writer 444 may manage the process of inserting associated XML into a portable document format document as it is being written and may, for example, draw from sources such as associated document storage, data input manually by a user of the PDF writer 444, or data drawn automatically from the document being converted into portable document format by the PDF writer 444. For example, the computing power of a personal computer being used to generate the PDF document may be used to OCR the contents of the document and obtain information intended for storage in the resulting PDF document. Still more-easily, if the document began as a text-based document of some type, relevant data may be pulled out of that data before it is converted into a PDF document.

A plugin or similar helper application for a typical PDF writer (or one which is a printer driver which, itself, calls upon another PDF writer), may be used to append associated XML data to the PDF document as it is being generated.

The network I/O 446 of the computer may be a part of the operating system or operate separately. The network I/O 446 may be used to transmit data converted by the computer to the MFP for document processing operations, such as storage or printing, to be performed thereon or to a server (discussed below) for storage or other operations.

Figure 5:
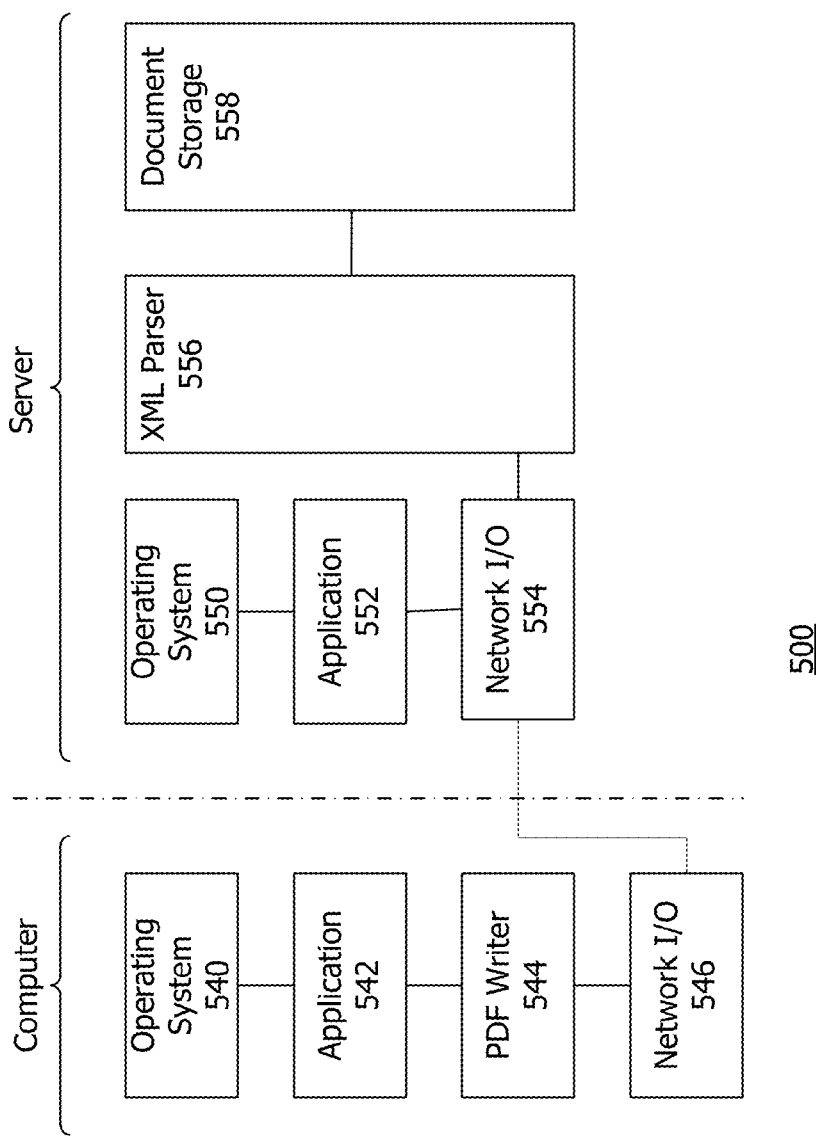
FIG. 5 is a block diagram of a software system for a server and a computer.

FIG. 5 is a block diagram of a software system 500 for a server, which may be server 140 of FIG. 1 and a computer, which may be computer 120 of FIG. 1.

The computer includes an operating system 540, an application 542, a PDF writer 544 and network I/O 546 which operate in much the same manner as the operating system 440, application 442, PDF writer 444, and network I/O 446 of FIG. 4. However, in this case, the network I/O 546 is used to communicate with the server so that subsequent actions may be taken by the server. These subsequent actions may include, as described above, automatic storage of the document in a specific location within a document management system or document archive as directed by XML data embedded by the PDF writer 544.

In some cases, the computer shown may, in fact, be a part of an MFP that receives a PDF document with instructions to print the PDF document or to direct the storage of the PDF document including XML data embedded in the PDF document that directs the MFP as to which document processing operations to perform or otherwise informs the storage process by the MFP. For example, the MFP may parse the PDF document in order to determine which server to direct the PDF document for storage.

Similarly, the server includes an operating system 550, one or more applications, such as application 552, and network I/O 554, which operate in much the same manner as the operating system 440, application 442, and network I/O 446 discussed with reference to FIG. 4.

However, the server, which may be representative of all or a part of a document management system or document archival system, also includes an XML parser 556 and document storage 558. The XML parser 556 is software that is designed to interact with extensible markup language (XML) data, such as XML embedded within PDF files, and to perform actions or operations, as directed, based upon the content of that XML. While identified as XML, various other types of parsable data may be incorporated into PDF documents and may be parsed by a corresponding parser type.

The XML parser 556 may access XML embedded within a PDF document and find categorization data suitable for properly archiving the PDF document. This data may be, for example, creation date of the PDF document, creation date of the original copy of the now-PDF document, the name or names of individuals who created or are referred-to in the content of the PDF document, instructions on storage locations or database fields that are associated with data in the PDF document, or other, similar data.

In response to this data, the XML Parser 556 may pass this data on to other aspects of the server or to other servers for action upon the parsed data. One example of such action may be storage of the PDF document at a particular location within document storage 558.

Dependent upon the implementation, the computer may create a PDF document, using the PDF writer 544, as discussed above, that embeds instructions in XML format within the resulting PDF document. These instructions may direct the operation of the server. Alternatively, data may be embedded within the PDF document in XML format that, when present, may indicate that certain operations, known by the XML parser 556, should be undertaken.

For example, a PDF document may include an instruction telling an XML parser 556 the specific location where to store a document and instructing the XML parser 556 to store the document. Alternatively, a PDF document may include a division name or a last name of a patient at a hospital that, along with instructions known by the XML parser 556 independently of the PDF document or the embedded XML data instruct the XML parser 556 of a location (i.e. a folder for the division or patient) in which to store the PDF document.

Document storage 558 may be one or more hard disk drives or may be a database taking up many physical hard disk drives (logically joined) or may be a document repository of a document management system or document archive. The XML data may direct that PDF document be stored in a particular location along with many other PDF documents, but may simultaneously include many pieces of data about the PDF document, that the XML indicates (or the XML parser 556, upon receipt, is programmed to act upon in a known way), are to be inserted into a document management system database or similar structure so that aspects of the archival or managed document may be searched upon for easier categorization and, later, retrieval. The XML data may, similarly, indicate that the document is meant for one of a number of archival storage locations or document management systems as opposed to others.

Description of Processes

Figure 6:
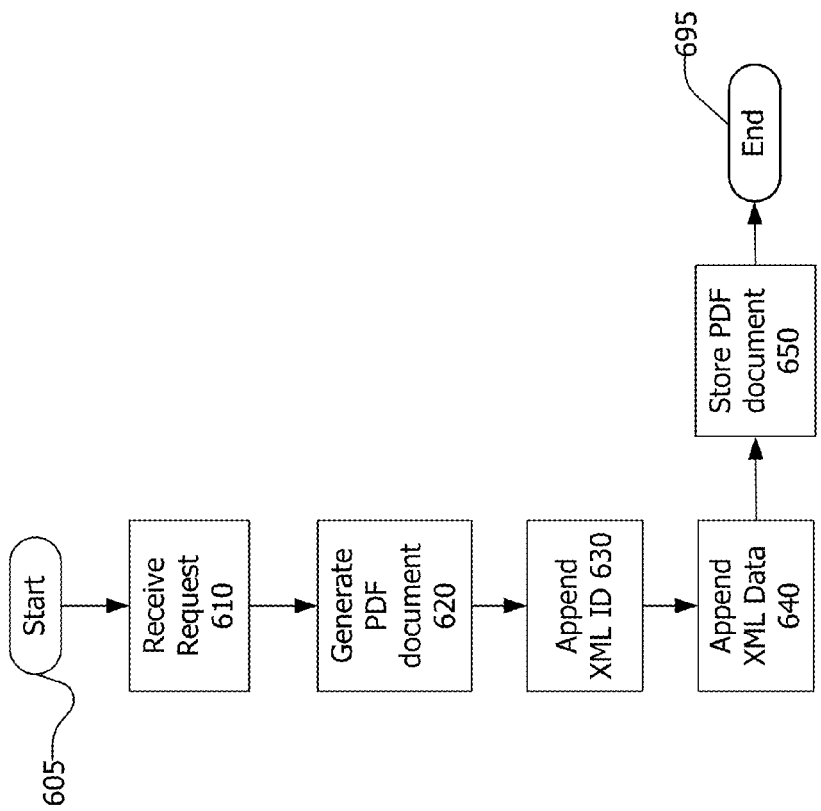
FIG. 6 is a flowchart of a process of appending extensible markup language data to a portable document format document.

FIG. 6 is a flowchart of a process of appending extensible markup language data to a portable document format document. The process may be performed by a computer, such as computer 120. The process may occur, as discussed more fully below, in conjunction with an MFP, such as document processing device 110, or a server, such as server 130, in communication over a network, such as network 140. The process starts at 605 and ends at 695. Many instances of the process may run concurrently to provide services to a corresponding number of document processing devices. The process may repeat or recur any number of times.

At 610, a computer receives a request to incorporate metadata within a PDF document. The metadata to be incorporated may be, for example, XML data. The request may be a standalone request to operate upon an existing PDF document, or may be a part of a request to a PDF writer to generate a PDF document and, in the process, to incorporate metadata therein. The metadata may be drawn from the document itself, created by a PDF writer, or may already exist when the request is made.

Next, the PDF writer generates the PDF document at 620. This process may begin with typical PDF writing of a PDF document conforming to the PDF-A/1b standard. As used herein, PDF document and portable document format both mean portable document format documents that conform to the PDF-A/1b standard promulgated for use in long-term storage of PDF documents. Similarly, the word "compliant" means conforming to the PDF-A/1b standard. As discussed above, this standard generally avoids references to any external elements or fonts in an attempt to ensure maximum compatibility going forward.

The generation of the PDF document at 620 may involve the conversion of other document types to PDF format. Under the PDF-A/1b standard, this process typically involves the writing of, at least, a PDF header, one or more PDF streams, and a PDF catalog. The PDF header is the first element of a PDF document, the one or more streams follow, with instructions and data laying out and describing the various elements that make up the PDF document, the catalog acts, in part, as a table of contents for the PDF document, but is the last element of the PDF document, near the end of the file.

Although generation of the PDF document is shown as a distinct part of the process at 620, steps 620-640 may take place simultaneously or substantially so. In this way, both PDF data and metadata may be written by one PDF writer at the same time rather than through multiple interactions with the PDF document.

A unique ID that indicates the presence of XML metadata object (hereafter referred to as XML ID) is appended by the computer at 630 during the PDF document generation or immediately following completion of PDF document generation. The XML ID may be appended, for example, immediately following the standard PDF-A/1b header as follows:

%PDF-1.4%
%âá Ð Ú

Where %âá Ð Ú consists of Hexadecimal numbers E2 E5 D0 DA in that sequence.

The typical header % PDF-1.4 that appears at the beginning of PDF documents to identify the document type is followed immediately by a special XML ID header. The XML ID can be used, at the very start of a PDF document, to indicate to an XML parser that the document contains XML data or other metadata that may be extracted. If the XML ID is missing (or a different, unknown one, is present), then the XML parser quickly knows that the PDF document does not contain any, relevant metadata to be parsed. This is beneficial because it enables an XML parser to quickly determine, without loading, parsing, and reading the entire PDF document, whether a given PDF document should be parsed to access metadata.

Next, the computer, which may use a PDF writer, appends XML data to the PDF document at 640. This appending immediately follows the PDF header and XML ID. This follows after the header and precedes any PDF data objects in any PDF stream. An example of such an object appears below:

```
0 0 obj
<<
/Type /FWSeamlessMetadata
/Length 1491
>>
stream
<XML_Metadata>
<?xml version="1.0" encoding="UTF-8"?>
<!-- Sample XML format file version 1.0.0 -->
<mfp_metadata>
<device_info>
<ip_address>101.101.101.101</ip_address>
<host_name>MFP-123456</host_name>
<location></location>
<contact_tel></contact_tel>
<FW_version>6654344</FW_version>
<manufacture>MFG</manufacture>
<model>MODEL</model>
<serial>CW475 83</serial>
<tempt_file_ver>1.0</tempt_file_ver>
</device_info>
<scan_info>
<scanned_date>2008/11/26</scanned_date>
<scanned_time>14:59:32.530</scanned_time>
<color_mode>BLACK</color_mode>
<resolution>200×200 dpi</resolution>
<file_format>MultipleTIFF</file_format>
<no_of_files>1</no_of_files>
<no_of_pages>1</no_of_pages>
<workflow>Email SCAN TO_FILE</workflow>
</scan_info>
<user_info>
<user_id></user_id>
<dept_code></dept_code>
<user_email></user_email>
```

```
</user_info>
<user_input>
<field1 name="language">English</field1>
<field2 name="format">PPTX</field2>
<field3 name="delivery">folder</field3>
<field4 name="deliveryaddress">C:\PDF_Output</field4>
<field5 name="filename">pptx_xml_text</field5>
<field6 name="Department">RD</field6>
<field7 name="email name">qa</field7>
<field8 name="domain name">redmap</field8>
<field9 name="despeckle">enabled</field9>
<field10 name="de skew">text</field10>
<field11 name="removecolor">disabled</field11>
<field12 name="removegeodistort">disabled</field12>
<field13 name="lowresmode">disabled</field13>
</user_input>
</mfp_metadata>
</XML_Metadata>
endstream
endobj
```

This metadata is merely an example of metadata that may be included, but other types of metadata with other instructions may also or alternatively be included.

At substantially the same time (as a part of step 620 going on substantially simultaneously with steps 630 and 640), standard PDF data is then written after the metadata. This PDF data may include page dictionary objects in a form substantially similar to the following:

```
3 0 obj
<<
/Type /Page
/Contents 22 0 R
/MediaBox[0 0 595 842]
/Parent 6 0 R
/Resources
<<
/Font
<<
/Font1 11 0 R
/Font2 14 0 R
/Font3 17 0 R
>>
/ProcSet [/PDF]
/XObject
<<
/Image1 18 0 R
/Image2 19 0 R
/Image3 20 0 R
/Image4 21 0 R
>>
>>
>>
endobj
```

Following that, a series of PDF page resource and content stream objects are written in a form substantially like:

```
11 0 obj
. . .
endobj
12 0 obj
. . .
endobj
22 0 obj
. . .
endobj
24 0 obj
<<
/Type /Page
/Contents 32 0 R
/MediaBox[0 0 595 842]
/Parent 6 0 R
/Resources
<<
/Font
<<
/Font2 14 0 R
/Font3 17 0 R
/Font4 28 0 R
>>
/ProcSet [/PDF]
/XObject
<<
/Image5 29 0 R
/Image6 30 0 R
>>
>>
>>
endobj
```

These should be familiar as standard parts of most PDF documents.

Following that, as a part of PDF generation at 620, a PDF pages dictionary object is inserted which appears substantially similar to:

```
6 0 obj
<<
/Type /Pages
/Count 4
/Kids [
    3 0 R
    24 0 R
    33 0 R
    37 0 R
]
>>
endobj
```

Next, additional rendering specific instructive non-XML metadata can be appended (as a part of 620-640) to the PDF document in the form of a PDF catalog object in a form substantially similar to:

```
5 0 obj
<<
/Type /Catalog
/Pages 6 0 R
/ResourceDiscard [2 [/Font1 /Image1 /Image2 /Image3 /Image4]
3 [/Font4 /Image5 /Image6]
4 [/Image7] ]
>>
endobj
```

The ResourceDiscard key includes an array of entries listing resources that may be discarded when each page dictionary is loaded. For example, in the PDF catalog above, Font1 can be discarded when the Page dictionary for the page 2 is loaded. This means that Font1 is only used on the first page of this document, while Font2 and Font3 are used throughout the rest of the document. This array will not reference any objects used on the last page of the document (as resources are discarded on the page following), thus single page documents will not contain this entry with the ResourceDiscard key.

Finally, the PDF standard xref (cross-reference table) is written and the PDF document is complete.

Thereafter, the PDF writer stores the resulting PDF document at 650. This storage may be to a local storage (e.g. a hard disk drive on the computer) or to a network storage or to a form of cloud storage. Storage may also be to transmit the resulting PDF document to a document management system or document archive for storage.

Figure 7:
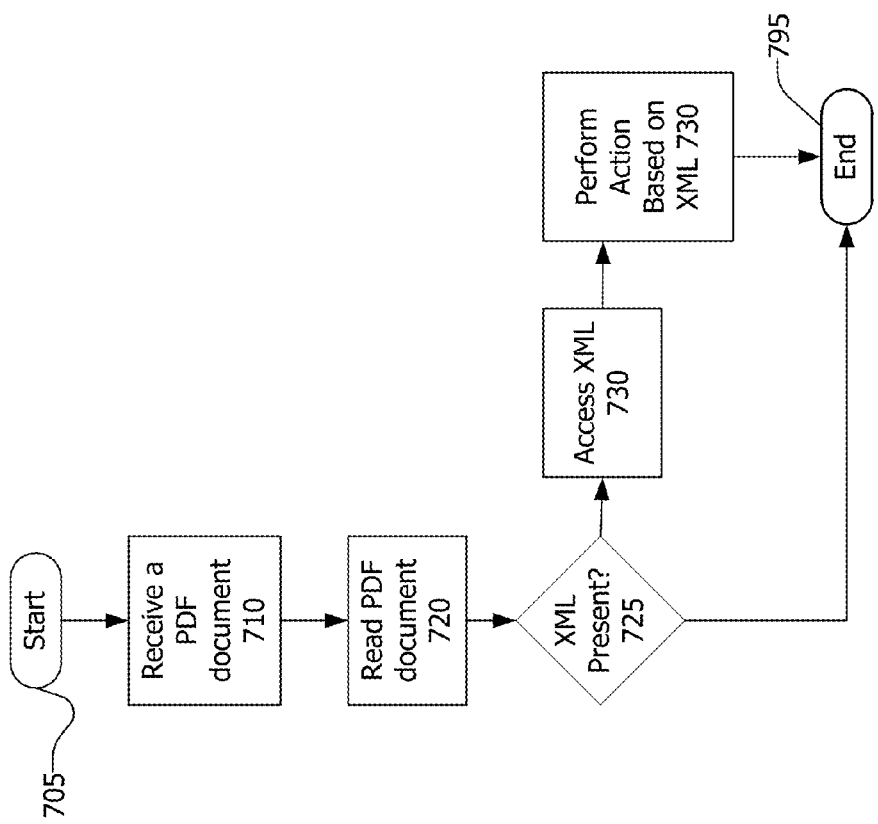
FIG. 7 is a flowchart of a process of using extensible markup language data appended to a portable document format document.

FIG. 7 is a flowchart of a process of using extensible markup language data appended to a portable document format document. The process may be performed by an MFP, such as document processing device 110, or by server, such as server 130. The process starts at 705 and ends at 795. Many instances of the process may run concurrently to provide services to a corresponding number of document processing devices. The process may repeat or recur any number of times.

The process begins at 710 when an MFP or server, such as MFP 110 or server 140 of FIG. 1, receive a PDF document including metadata. As discussed above, XML is typically used, but other forms of metadata may be included. Upon receipt at an MFP or a server, either may be programmed to quickly ascertain whether or not there is metadata within the PDF document and, if so, to act upon it as directed by the metadata (or programming in conjunction with the metadata).

At 720, the MFP or server reads the PDF document (or begins reading) to determine if metadata is within the PDF document. This process may include, for example, checking the PDF header to determine if there is an XML ID, or similar data element within the PDF document. The XML ID appearing as the second line of the PDF document as a part of or immediately following the PDF header is helpful in enabling the MFP or server to quickly ascertain without parsing the entire PDF document, all resources and data streams, or the PDF catalog whether or not metadata is encapsulated in the PDF document. In this way, an XML parser may operate much more quickly through a large number of documents by only parsing the first few lines of each PDF document, unless a XML ID is present. As indicated above, this enables a lower-power processor to handle retrieval of XML data from within PDF documents. Only those documents that actually include an appropriate XML ID immediately below the header will continue to be parsed to obtain any additional XML data.

If XML is not present in the PDF document at 725, then the process may end. Other, unrelated processes may take place, for example, storing the PDF document to a default location, printing the PDF document, emailing the PDF document, or otherwise dealing with the receipt of the PDF document, but because there is no XML present in the PDF document, XML is not used as a part of that process.

If XML is present in the PDF document at 725, then the MFP or server accesses the XML at 730. This access, like determining whether XML is present in the PDF document, is simplified because the XML is embedded within the PDF document immediately following the PDF header as the first object in the PDF document. The XML is flagged with a metadata tag which is automatically ignored by PDF rendering software. Also, the XML makes no reference to documents, fonts, or other rendering resources external to the PDF document. As a result, the inclusion of the XML is fully compliant with PDF-A/1b.

The XML data is accessed in order to perform an action based upon the XML at 730. First, data is obtained by the XML parser from the PDF document. The XML may encapsulate data, as shown above, such as a user identification number, a username, a user email address, in addition to data about the document either derived from the document or, as shown in the data above, input by a user. Data may be input, for example, by a user through an aspect of the PDF writer or a print driver.

This XML data may be used to perform an action in the form of instructions for actions to be taken with respect to the PDF document. For example, XML data may indicate that the PDF document should be stored (and identify a server, document management system, document archive, or other storage location), should be printed (and/or to which printing device), should be moved to a particular location, should be emailed to a particular email address or user ID, should have optical character recognition performed thereon, or any number of other instructions.

Alternatively, the XML data may be data that directs an external XML parser or job parser to perform functions thereon. For example, the embedded XML may merely be data such as username, user emails, document language, document creation data, document department, or other document data. This data may be used in particular functions for, for example, storing all documents pertaining to a particular department in a particular location within a document archive. Or, the data may be used to automatically fill data categories in a document management system, such as the department from which the document was derived or the user who created the document. Numerous options for use of the data, either as direct commands as to what to do with a document, or as data fields from which external software, such as software reliant upon the XML parser or job parser, may determine what actions, if any, to perform on the PDF document containing the XML.

CLOSING COMMENTS

Throughout this description, the embodiments and examples shown should be considered as exemplars, rather than limitations on the apparatus and procedures disclosed or claimed. Although many of the examples presented herein involve specific combinations of method acts or system elements, it should be understood that those acts and those elements may be combined in other ways to accomplish the same objectives. With regard to flowcharts, additional and fewer steps may be taken, and the steps as shown may be combined or further refined to achieve the methods described herein. Acts, elements and features discussed only in connection with one embodiment are not intended to be excluded from a similar role in other embodiments.

As used herein, "plurality" means two or more. As used herein, a "set" of items may include one or more of such items. As used herein, whether in the written description or the claims, the terms "comprising", "including", "carrying", "having", "containing", "involving", and the like are to be understood to be open-ended, i.e., to mean including but not limited to. Only the transitional phrases "consisting of" and "consisting essentially of", respectively, are closed or semi-closed transitional phrases with respect to claims. Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements. As used herein, "and/or" means that the listed items are alternatives, but the alternatives also include any combination of the listed items.

It is claimed:

1. A system comprising a portable document format writer for:

receiving a request to generate a portable document format document including custom metadata;

generating the portable document format document in a form compliant with a portable document format standard, the portable document format data including at least a at least one portable document format header, at least one portable document format stream, and a portable document format catalog;

inserting at least one extensible markup language identifier to the portable document format document immediately following the at least one portable document format header;

inserting at least one set of extensible markup language data to the portable document format document, as directed by the request, within the portable document format data immediately following the at least one extensible markup language identifier and before the at least one portable document format stream, and preceding the portable document format catalog; and storing the portable document format document.

2. The system of claim 1 further comprising a document management system for:

receiving the portable document format document;

accessing the extensible markup language identifier and extensible markup language data in order to derive instruction data without accessing the portable document format catalog; and performing an action on the portable document format document as directed by the instruction data.

3. The system of claim 2, wherein the instruction data directs the document management system to store the portable document format data in a specific location.

4. The system of claim 2, wherein the instruction data comprises at least one of the date the portable document format document was created, the date the portable document format document was scanned, the user who scanned the portable document format document, the user who created the portable document format document, a category under which to categorize the portable document format document, and an identification of a further action to be performed on the portable document format document.

5. The system of claim 2, wherein the at least one extensible markup language identifier and the at least one set of extensible markup language data are accessed quickly by the document management system without completing a review of the entire portable document format document.

6. The system of claim 1, wherein the inclusion of the at least one set of extensible markup language data and the at least one extensible markup language identifier do not interfere with PDF/A-1b standard compliance.

7. The system of claim 1, further comprising a multifunction peripheral for outputting the portable document format document in accordance with instructions within the at least one extensible markup language identifier and the at least one set of extensible markup language data.

8. The system of claim 7, wherein the instructions direct the multifunction peripheral to print the portable document format document.

9. The system of claim 1, wherein the portable document format writer is a part of a print driver operating on a computing device.

10. A method for creating PDF documents with embedded XML data comprising:

receiving a request to generate a portable document format document including custom metadata;

generating the portable document format document in a form compliant with portable document format, the portable document format data including at least a at least one portable document format header, at least one portable document format stream, and a portable document format catalog;

inserting at least one extensible markup language identifier to the portable document format document immediately following the at least one portable document format header;

inserting at least one set of extensible markup language data to the portable document format document, as directed by the request, within the portable document format data immediately following the at least one extensible markup language identifier and before the at least one portable document format stream, and preceding the portable document format catalog; and storing the portable document format document.

11. The method of claim 10 further comprising:

receiving the portable document format document;

accessing the extensible markup language identifier and extensible markup language data in order to derive instruction data without accessing the portable document format catalog; and performing an action on the portable document format document as directed by the instruction data.

12. The method of claim 11, wherein the instruction data directs a document management system to store the portable document format data in a specific location.

13. The method of claim 11, wherein the instruction data comprises at least one of the date the portable document format document was created, the date the portable document format document was scanned, the user who scanned the portable document format document, the user who created the portable document format document, a category under which to categorize the portable document format document, and an identification of a further action to be performed on the portable document format document.

14. The method of claim 11, wherein the at least one extensible markup language identifier and the at least one set of extensible markup language data are accessed quickly by a document management system without completing a review of the entire portable document format document.

15. The method of claim 10, wherein the inclusion of the at least one set of extensible markup language data and the at least one extensible markup language identifier do not interfere with PDF/A-1b standard compliance.

16. The method of claim 10, further comprising a multifunction peripheral for outputting the portable document format document in accordance with instructions within the at least one extensible markup language identifier and the at least one set of extensible markup language data.

17. The method of claim 16, wherein the instructions direct the multifunction peripheral to print the portable document format document.

18. A system, comprising:

a print driver for:

receiving a request to generate a portable document format document including custom metadata;

generating the portable document format document in a form compliant with portable document format, the portable document format data including at least a at least one portable document format header, at least one portable document format stream, and a portable document format catalog;

inserting at least one extensible markup language identifier to the portable document format document immediately following the at least one portable document format header;

inserting at least one set of extensible markup language data to the portable document format document, as directed by the request, within the portable document format data immediately following the at least one extensible markup language identifier and before the at least one portable document format stream, and preceding the portable document format catalog; and storing the portable document format document; and a multifunction peripheral device for:

receiving the portable document format document;

accessing the extensible markup language identifier and extensible markup language data in order to derive instruction data without accessing the portable document format catalog; and performing an action on the portable document format document as directed by the instruction data.

\* \* \* \* \*